J. C. WEINMAN.
HAME FASTENER AND REINFORCEMENT FOR HORSE COLLARS.
APPLICATION FILED APR. 1, 1913.
1,090,896.
Patented Mar. 24, 1914.
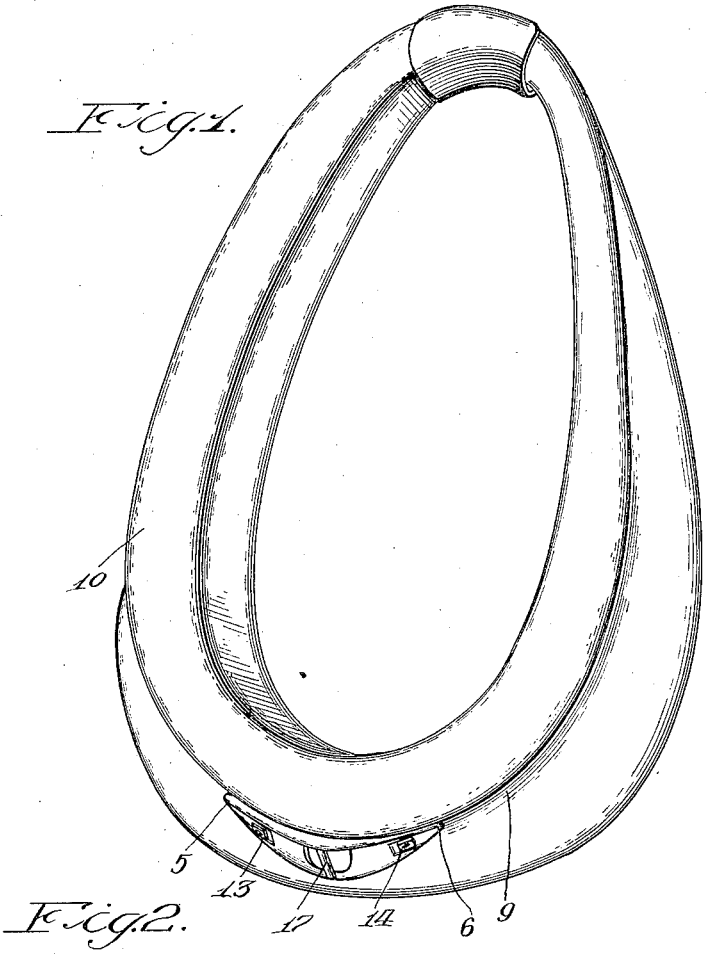
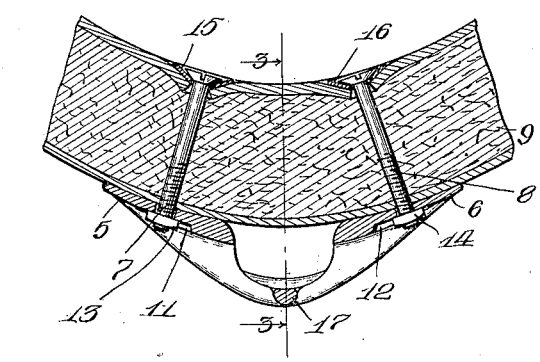
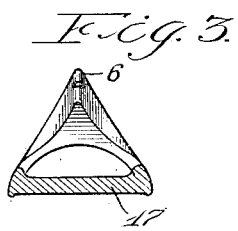
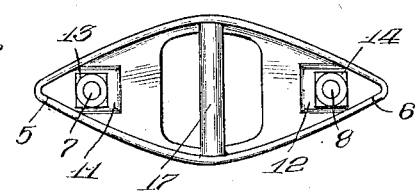
Witnesses:
Inventor
Joseph C. Weinman.
By Wilfred C. Lane.
Attys.

UNITED STATES PATENT OFFICE.

JOSEPH C. WEINMAN, OF BOONE, IOWA.

HAME-FASTENER AND REINFORCEMENT FOR HORSE-COLLARS.

1,090,896.  Specification of Letters Patent.  Patented Mar. 24, 1914.

Application filed April 1, 1913. Serial No. 758,146.

*To all whom it may concern:*

Be it known that I, JOSEPH C. WEINMAN, a citizen of the United States, and a resident of Boone, in the county of Boone and State of Iowa, have invented a new and useful Improvement in Hame-Fasteners and Reinforcement for Horse-Collars, of which the following is a specification.

The main objects of this invention are to provide a hame fastener for horse collars composed of a single casting, which will reinforce the collar at the throat, and which has a member integral with it through which the hame strap may be passed to prevent the hames from slipping; also to provide a hame fastener which is simple and cheap to manufacture and can be quickly and easily secured to a horse collar, and which can be used to repair any worn portions of the collar.

These and other features, advantages and capabilities of the invention will become apparent from a detailed description of the drawings in which—

Figure 1 is a perspective view of a horse collar with the improved hame fastener attached thereto. Fig. 2 is a sectional view of the throat of the collar with the fastener attached thereto showing the means of securing the fastener to the collar. Fig. 3 is a cross section of the fastener; and Fig. 4 is a bottom plan view of the same.

In the construction shown, the fastener which is a single casting of any suitable metal or the like has two tapering end portions 5 and 6 in which are formed screw openings through which screws or bolts 7 and 8 are passed. The side of the fastener which lies in the groove 9 of the collar 10 is shaped convex-like to fit snugly into the groove. The other side or outer side of the fastener is concave. In the tapering ends 5 and 6 on the outer side are provided angular recesses 11 and 12 by which to securely lock nuts 13 and 14 which engage the ends of the screws or bolts 7 and 8. As shown in Fig. 2, the screws 7 and 8 are passed through dished washers 15 and 16, which press snugly into the inside of the collar 10, the screws passing through the collar, then through the ends 5 and 6 of the fastener, and finally through the nuts 13 and 14, the nuts being prevented from movement by the angular recesses 11 and 12. Should the screws or bolts extend out too far, obviously, the ends may be cut off so as not to interfere with the hames.

At the outer middle portion of the fastener is provided a cross arm 17. Under this arm 17, the hame strap is passed to securely hold the hames in place. As shown the inner middle portion of the fastener under the arm 17 is cut away, to permit the same to be easily cast, and incidentally reducing the weight of the article without impairing the utility of the same.

While there is herein shown and described only one embodiment of the invention, it is to be understood that various changes and modifications may be made by those skilled in the art without departing from the scope of the invention as defined in the appending claims.

Having thus described my invention, what I claim as new and desire to secure by Letters Patent is:

1. A reinforcement for horse collars comprising one integral piece of metal having the medial portion thereof cut away, side members for connecting the ends together, and a cross arm connecting said side members.

2. A device of the character described comprising one integral piece of metal adapted to fit within the groove of a horse collar, the medial portion thereof being cut away to form side members, a cross bar connecting the side members, and means for permanently connecting the ends to the collar for the purpose specified.

3. As a new article of manufacture a hame fastener formed of an integral piece of metal and having an arcuate configuration, the outer face thereof being concave, the sides thereof being convex and tapering to a point, the medial portion thereof being cut away and forming side members, a cross bar connecting said side members, and means for permanently connecting the ends to a horse collar for the purpose specified.

In witness whereof, I hereunto subscribe my name to this specification in the presence of two witnesses.

JOSEPH C. WEINMAN.

Witnesses:
 T. E. MEANS,
 E. HARNER.

Copies of this patent may be obtained for five cents each, by addressing the "Commissioner of Patents. Washington, D. C."